United States Patent [19]
Freeman

[11] Patent Number: 6,019,443
[45] Date of Patent: Feb. 1, 2000

[54] DEBRIS CUTTER FOR SPROCKET DRIVE

[76] Inventor: Ernie Freeman, 3467 Kings Mill Run, Rocky River, Ohio 44116

[21] Appl. No.: 09/017,639

[22] Filed: Feb. 2, 1998

[51] Int. Cl.$^7$ .................................................. B62D 55/088
[52] U.S. Cl. ........................................... 305/110; 305/100
[58] Field of Search ..................................... 305/100, 107, 305/109, 110; 404/129; 172/610

[56] References Cited

U.S. PATENT DOCUMENTS

| | | | |
|---|---|---|---|
| 2,560,307 | 7/1951 | Slemmons | 305/110 |
| 4,198,103 | 4/1980 | Ward et al. | 305/110 |
| 4,818,040 | 4/1989 | Mezzancella et al. | 305/110 |
| 4,830,439 | 5/1989 | Collins et al. | 305/110 |
| 5,226,703 | 7/1993 | Norman | 305/107 X |
| 5,330,260 | 7/1994 | Freeman | 305/110 |
| 5,370,451 | 12/1994 | Brownlee et al. | 305/110 |
| 5,451,100 | 9/1995 | Freeman | 305/110 |
| 5,553,932 | 9/1996 | Freeman | 305/107 |
| 5,697,683 | 12/1997 | Arulandu et al. | 305/107 X |
| 5,713,644 | 2/1998 | Freeman | 305/110 |
| 5,725,292 | 3/1998 | Keedy et al. | 305/110 |

FOREIGN PATENT DOCUMENTS

| | | | |
|---|---|---|---|
| 2304507 | 10/1976 | France | 305/110 |

*Primary Examiner*—Russell D. Stormer
*Attorney, Agent, or Firm*—Pearne, Gordon, McCoy & Granger

[57] ABSTRACT

In a track-driven tractor, stationary cutter blades are fixed to a chassis of the tractor and cooperating rotating cutter blades are fixed to a sprocket hub of the tractor. The cutting blades are operable to cut refuse entrained between the sprocket and the chassis, which tends to wrap around the associated hub, so as to avoid the build-up of refuse on the hub which otherwise can lead to unnecessary wear of the sprocket, the hub, and an assembly forming a seal between the hub and the chassis, as well as unnecessary fuel consumption.

5 Claims, 3 Drawing Sheets

DEBRIS CUTTER FOR SPROCKET DRIVE

BACKGROUND OF THE INVENTION

The present invention relates to improvements in land vehicles and, in particular, to tractors used to disperse and/or compact refuse at a landfill.

PRIOR ART

The capacity of existing landfills has greatly diminished and the cost of establishing new landfills has greatly escalated due to environmental concerns. Thus, it is important that refuse materials deposited in a landfill be distributed and compacted as fully as is practical. To this end, track-driven tractors have been utilized to spread newly received refuse. Currently, these tractors are fitted with sprocket drives that have rotating hubs and sprockets attached to the hubs. The rotating sprockets move the tracks which propel the tractor. A blade is provided on the tractor to distribute the refuse. A serious problem has existed with the operation of this kind of equipment where refuse tends to be tightly wrapped around the hubs as the sprocket drives rotate. Materials such as sheet metal, metal bar, pipe, rugs and other sinewy components are entrained by the sprocket and/or the track causing it to wrap around its associated hub. Typically, the entrained material accumulates around the hub at the inboard side of the sprocket.

The accumulation of refuse on the sprocket drive has several disadvantages. A large drag resisting sprocket drive rotation is produced causing unnecessary fuel consumption. The drive train is subjected to unnecessary wear to overcome this drag or resistance. The sprockets and hubs wear out prematurely because the refuse accumulated on the hub rubs against hub and sprocket surfaces causing severe abrasion. Additionally, the refuse accumulated on the hub rips up duo-cone seals provided to form a seal between the hub and the tractor chassis.

Complicating this situation is the lack of any quick, practical way of removing the accumulated material from its entanglement with a sprocket drive. The practice is to remove the material with hand labor and this is dangerous to the workman. There is a risk of grasping a razor sharp edge of a broken or torn article hidden in various unsanitary debris and even heavy gloves may not afford sufficient protection to the workman's hands.

SUMMARY OF THE INVENTION

The invention provides a method and apparatus for eliminating the build-up of harmful accumulations of refuse material around the sprocket drive of a track-driven tractor. The apparatus comprises a pair of cutter blades associated with a sprocket drive. One of the cutter blades is fixed on the sprocket drive for rotation with the sprocket drive and the other is fixed with respect to the sprocket drive. Rotation of the sprocket drive causes its cutter blade to revolve in a path that sweeps sufficiently close to the fixed cutter blade to produce a shearing or cutting action therewith. Material entrained by a sprocket and/or a track that begins to be wrapped around a hub of the sprocket drive is severed by the pair of blades. The severing action prevents the material from being wound in multiple ever-tightening turns. Once the material is severed, it tends to fall through an opening formed between the tractor and the track thereby avoiding a build-up of the same.

In the preferred embodiment, the cutter blades include cutting edges that are generally oblique with the sprocket drive axis and angle generally toward the opening formed between the tractor and the track. Additionally, the areas forming the blade edges are plate-like in configuration and can operate in either direction of rotation of the wheel. The disclosed cutter blades are arranged to be retrofitted on existing tractors.

In one version of the invention, a stationary blade structure fixed with respect to the sprocket drive comprises a cutting plate and a mounting plate oriented at right angles to one another. The mounting plate is attached to the chassis of the tractor by threaded fasteners. The rotating cutter blade structure is complementary to the geometric shape of a hub of the sprocket drive and is welded to the hub. The cutter blade structures afford a highly effective trash cutting and sprocket drive cleaning system with an extended service life.

DESCRIPTION OF THE PREFERRED EMBODIMENT

The disclosures of U.S. Pat. Nos. 5,330,260, 5,451,100, and 5,553,932 are expressly incorporated herein by reference in their entireties.

Figure 1:
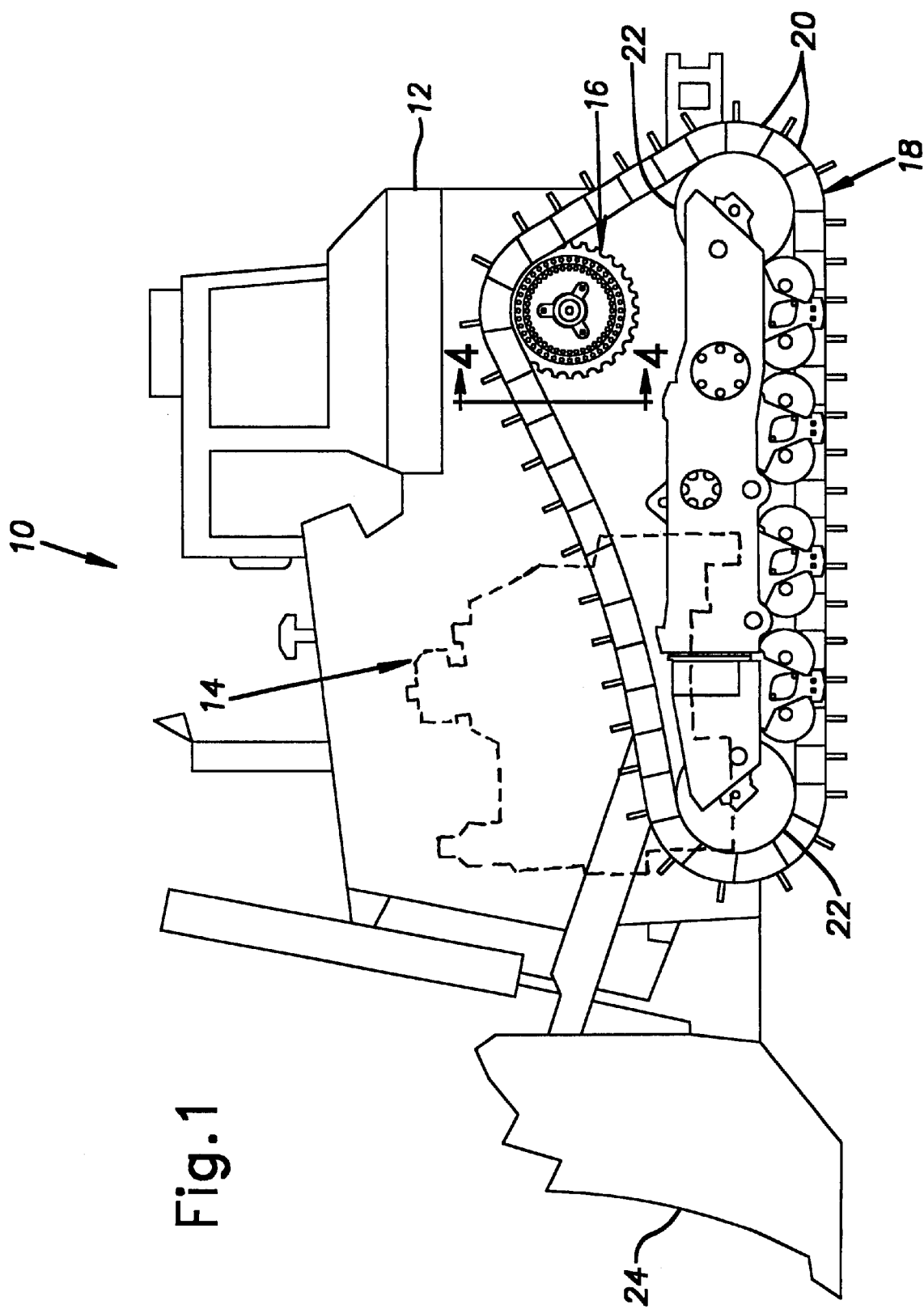
FIG. 1 is a elevational view of a track-driven tractor employing the cutter blade assemblies of the present invention.

FIG. 1 illustrates an elevated sprocket tractor 10 of the type used by the landfill industry to distribute refuge or debris. Commonly known examples of such tractors 10 are machines marketed by Caterpillar, Inc. under the model designations D8N, D9N, D10N, and D11N. The tractor 10 includes a chassis 12 on which is carried an engine and drive train generally indicated at 14. The engine and drive train 14 selectively propel a pair of sprocket drive assemblies 16 for either forward or backward rotation. One sprocket drive assembly 16 is located on the left side of the tractor 10 and the other sprocket drive assembly 16 is located on the right side of the tractor 10 (not shown in FIG. 1). The rotation of the sprocket drive assemblies 16 moves associated tracks 18 comprised of a plurality of track shoes 20 to propel the tractor 10. The sprocket drive assemblies 16 are located at an elevated position, that is, higher than track rollers 22 located near the portion of the track 18 engaging the ground. An adjustable blade is provided at the front of the tractor 10 to distribute the debris or refuse in the landfill as the tractor 10 moves back and forth over the landfill area being filled.

Figure 2:
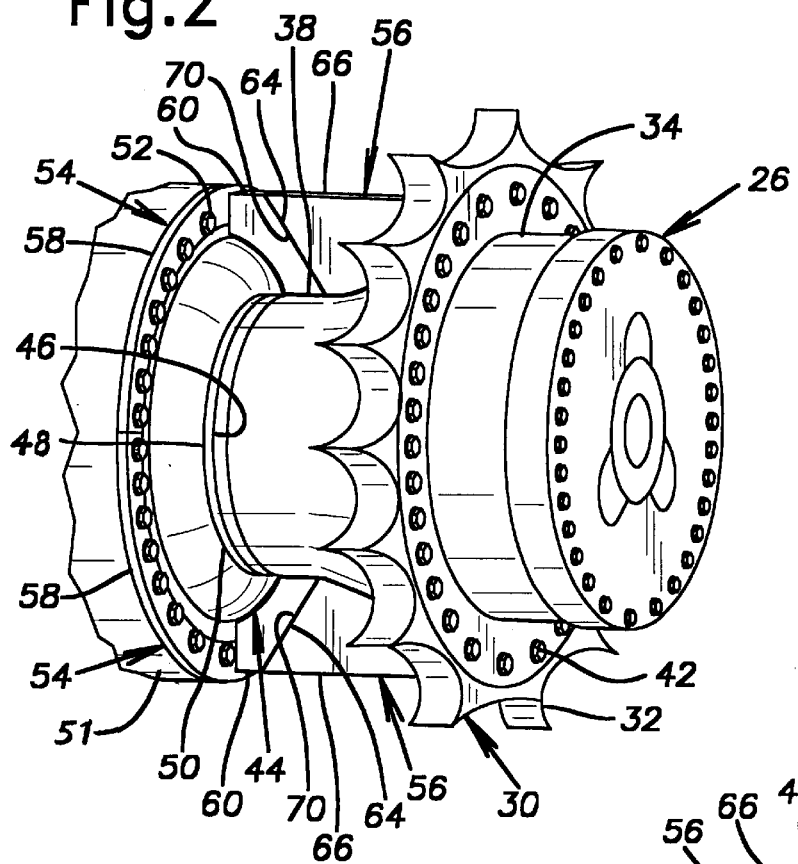
FIG. 2 is a fragmentary perspective view of the tractor of FIG. 1 in the area of the sprocket hub assembly associated with the left side of the tractor as viewed looking generally toward the chassis.
Figure 3:
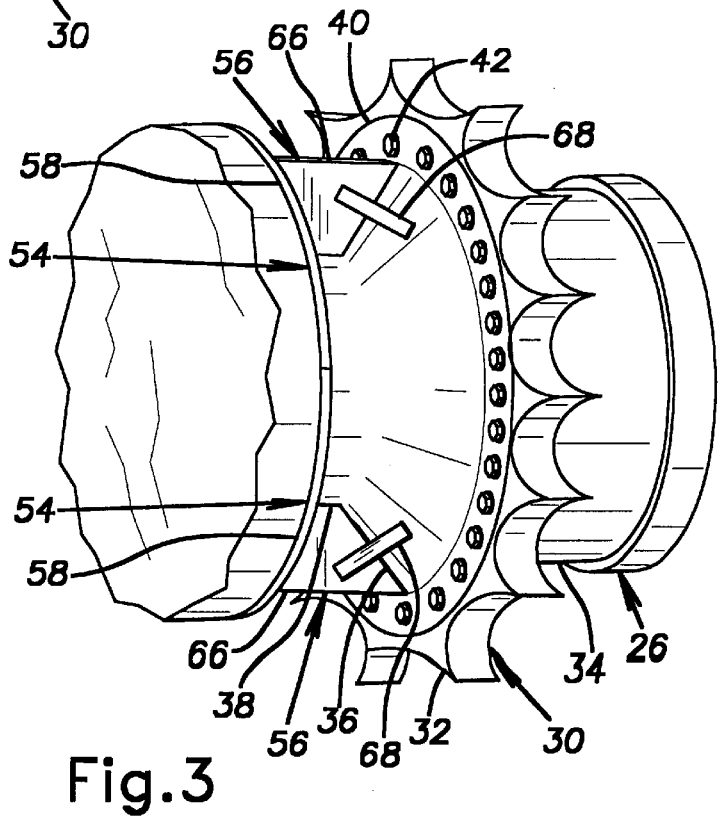
FIG. 3 is a fragmentary perspective view similar to FIG. 2 but as viewed looking generally away from the chassis.
Figure 4:
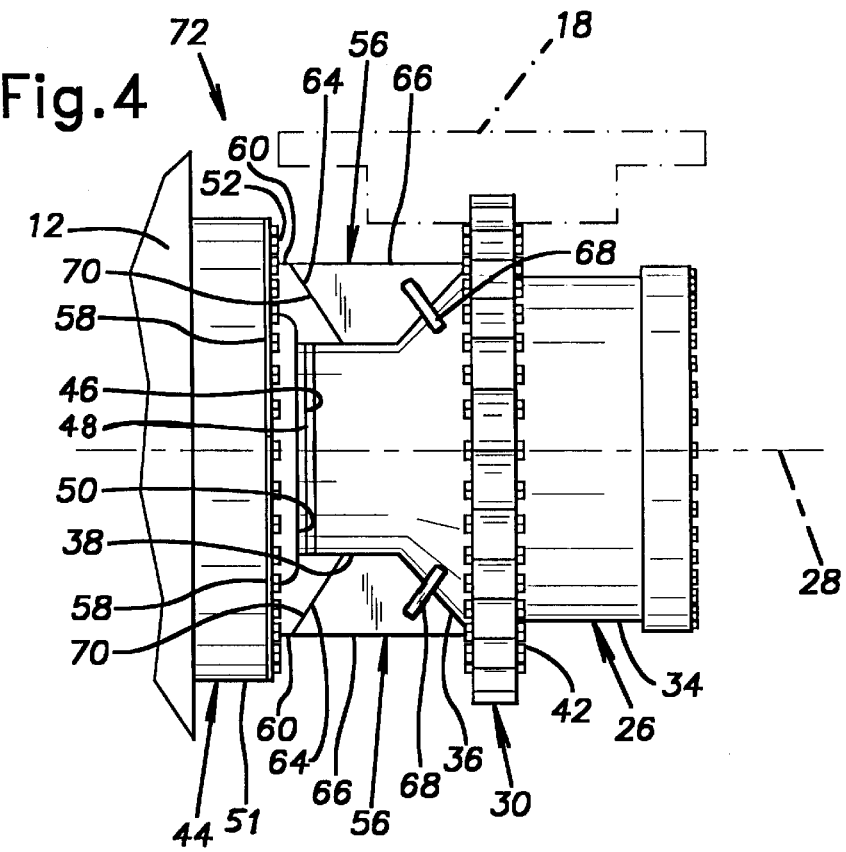
FIG. 4 is a fragmentary elevational view of the sprocket hub assembly associated with the left side of the tractor taken along line 4—4 of FIG. 1 with the track shown in dashed line for clarity.

As best shown in FIGS. 2–4, each sprocket drive assembly 16 includes a hub 26 having a horizontal axis of rotation 28 and a sprocket 30. The sprocket 30 has a plurality of radially extending teeth 32 for engaging and moving the associated track 18 as the sprocket 30 is rotated. The hub 26 has a cylindrical outer portion 34, a frusto-conical central portion 36, and a cylindrical inner portion 38. A mounting flange 40 is located on the outer periphery of the hub 26 between the outer and central portions 34, 36. The mounting flange 40 has a series of axially extending and circumferentially spaced holes for receiving threaded fasteners 42 to mount the sprocket 30 to the hub 26. The inner portion 38 of the hub 26 extends into the chassis 12 and is connected to the engine and drive train 14 for rotation of the sprocket drive assembly 16.

A duo-cone seal 44 known in the industry has a plane of separation and relative rotation at 46 which provides a seal between the rotating hub 26 and the stationary chassis 12. The duo-cone seal 44 includes cooperating hub and chassis sealing members 48, 50. The hub sealing member 48 is annular-shaped and is secured to the rotating hub 46. The hub sealing member 48 is preferably sealed to the hub 46 with an o-ring. The chassis sealing member 50 is annular shaped and secured to the chassis 12 adjacent the hub sealing member 48. The chassis sealing member is preferably sealed to the chassis 12 with an o-ring. The rotating hub sealing member 48 cooperates with the stationary chassis sealing member 50 to provide a seal at the plane of separation and relative rotation 46.

In accordance with the invention, a pair of chassis or stationary cutter blade assemblies 54 are installed on the chassis 12 in fixed relation to the associated sprocket drive assembly 16. Additionally, a pair of hub or rotating cutter blade assemblies 56 are installed on the sprocket drive assembly 16 in rotational relation to the associated chassis cutter blade assemblies 54. Preferably, each of the sprocket drive assemblies 16 are constructed in essentially the same manner and are fitted with chassis cutter blade assemblies 54 and hub cutter blade assemblies 56 that are essentially identical.

Figure 5:
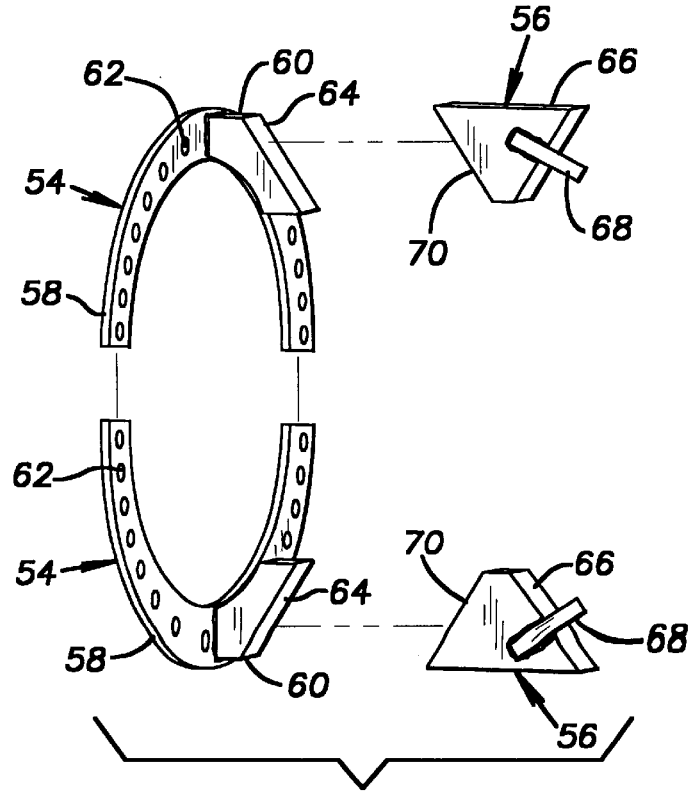
FIG. 5 is a perspective exploded view of the cutter blade assemblies illustrated in FIGS. 1–4.

As best shown in FIG. 5, each chassis cutter blade assembly 54 is a weldment of heavy flat steel plate and includes a mounting plate 58, of, for example, ⅝ inch or ¾ inch thickness and a cutting blade or plate 60 of, for example, 1½ inch thickness. The cutting plate 60 is substantially perpendicular to the mounting plate 58 and is welded to generally the center of the mounting plate 58. Alternatively, the cutting plate 60 could be welded directly to the chassis 12. The mounting plate 58 is sized and shaped for cooperating with at least a portion of the outer face of a mounting flange 51 of the chassis 12. Preferably, the mounting plate 58 is a segment of a circular ring that extends for approximately one-half the diameter of the mounting flange 51 so that the two mounting plates 58 extend around the entire diameter of the outer face of the mounting flange 51. The mounting plate 58 has a series of axially extending and circumferentially spaced holes 62 for receiving fasteners 52 of the mounting flange 51.

The cutting plate 60 is sized and shaped for extending axially outward from the chassis 12 and extends into a space or cavity formed between the sprocket 30 and the chassis 12. The cutting plate 60 has a geometry which is complementary with the exposed surface of the chassis 12, the duo-cone seal 44, and the hub inner portion 38. The cutting plate 60 includes a cutting edge 64 which is preferably at an angle to the axis of rotation 28 when installed. As best shown in FIG. 4, the cutting edge 64 is preferably at an oblique angle which extends generally toward an opening 72 formed between the chassis 12 and the track 18.

As best shown in FIGS. 2 and 4, the chassis cutter blade assemblies 54 are attached to the chassis 12 by the fasteners 52 of the mounting flange 51 on the chassis 12. The fasteners 52 extend through the mounting plate 58 of the chassis cutter blade assembly 54 and into the mounting flange 51. The cutting plates 60 of the chassis cutter blade assemblies 54 are equally spaced about the outer periphery of the hub 26, that is, located about 180 degrees apart. Preferably, one of the cutting plates 60 is located above the hub 26 and the other one of the cutting plates 60 is located below the hub 26.

As best shown in FIG. 5, each of the hub cutter blade assemblies 56 are a heavy steel plate weldment of hot rolled steel and include a cutter blade or plate 66 of, for example 1½ inch thickness and a pair of gussets or straps 68 of, for example, ⅞ inch thickness. The straps 68 are welded to opposite sides of the cutter plate 66 for bracing the cutter plate 66 against deflection out of its plane when installed. The cutter plate 66 preferably has a mounting surface with a geometry that is complementary to the exposed surface of the inner and central portions 36, 38 of the hub 26. The cutter plate 66 includes a cutting edge 70 that is complementary to the cutting edge 64 of the chassis cutter blade assembly 54. Therefore the cutting edge 70 is preferably at an angle to the axis of rotation 28 when installed and, as best shown in FIG. 4, the cutting edge 70 is preferably at an oblique angle which extends generally toward an opening 72 formed between the chassis 12 and the track 18.

As best shown in FIGS. 3 and 4, the hub cutter blade assemblies 56 are fixed to the sprocket hub assembly 16 by welding ends of the straps 68 to the central portion 36 of the hub 26 and preferably welding the periphery of the mounting surface of the cutter plate 66 to the inner and central portions 36, 38 of the hub 26. The hub cutter blade assemblies 54 are equally spaced on the outer periphery of the hub 26, that is, located about 180 degrees apart.

As the sprocket drive assembly 16 turns, the cutting edges 70 of the rotating cutter blade assemblies 56 sweep past the cutting edges 64 of the stationary cutter blade assemblies 54 in a circular path about the axis of rotation 26 of the sprocket drive assembly 16. The various parts are proportioned so that there is a slight clearance of, for example, ⅛ inch between the respective cutting edges 64, 70. When the rotating cutter blade assemblies 56 pass the stationary cutter blade assemblies 54, any refuse material entrained between the chassis 12 and the sprocket 30, and tending to be wrapped about the hub 26 of the sprocket drive assembly 16, is cut or sheared by the respective cutting edges 64, 70 or is at least scored by such cutting edges 64, 70 if not fully severed. The cut or scored material is, consequently, unable to entwine itself around the sprocket drive assembly 16 and build-up in the cavity formed between the chassis 12 and the sprocket 30.

The rotating cutting edge 70 is substantially spaced from the sprocket 30 and angled toward the opening 72 formed between the chassis 12 and the track 18 so that the debris tends to fall through the opening 72 and prevents the accumulation or build-up of the debris within the cavity formed by the sprocket drive assembly 16, the chassis 12, and the track 18. The rotating cutting edge 70 is preferably spaced from the sprocket 30 a distance greater than ten times the operating clearance between the cutting edges 64, 70. Preferably, at least a portion of the cutting edges 64, 70 are located radially outward from the plane of separation 46 of the duo-cone seal.

The two stationary cutting edges 64 provide an efficient cutting structure because, upon each revolution of the sprocket hub assembly 16, refuse material can be double-cut, one time at each of the stationary cutting edges 64. Since refuse material is being carried up in one instance and being carried down in the other instance, there is assurance that such material, even if biased in some manner, will be adequately cut or scored by the cutting edges 64, 70. The two rotating cutting edges 70, along with the two stationary cutting edges 64, cut the refuse material four times upon each revolution of the sprocket drive assembly 16. It is noted that other quantities of stationary and rotating cutting edges 64, 70 can be utilized as long as there is at least one stationary cutting edge 64 and at least one rotating cutting edge 70. However, the illustrated configuration is believed to be the most efficient and effective. It is also noted that the cutter blades assemblies 54, 56 are bi-directional and work efficiently in either direction of sprocket hub assembly 16 rotation.

The disclosed cutter arrangement is particularly suited for retrofitting tractors 10 in the field. A kit of chassis and hub cutter blade assemblies 54, 56 is provided generally as described above for a particular model of tractor 10 and sprocket hub assembly 16 style. It has been found that a particularly efficient technique of fitting stationary and rotating cutter blade assemblies 54, 56 is to initially provide the stationary cutter blade assemblies 54 with extra stock in the cutting plate 60 at the cutting edge 64 so that there is some interference between the stationary and rotating cutting plates or blades 60, 66. The hub 26 is manually rotated until the rotating cutting plate 66 contacts the stationary cutting plate 60. Then, a cutting torch is used to burn the interfering material away from the stationary cutting plate 60 leaving a slight clearance of about ⅛ inch between the resulting stationary cutting edge 64 and the rotating cutting edge 70.

It should be evident that this disclosure is by way of example and that various changes may be made by adding, modifying or eliminating details without departing from the fair scope of the teaching contained in this disclosure. For example, the cutting blades can be forged or cast with integral reinforcement gussets or mounting flanges. The invention can be applied to other tractor drive sprocket arrangements such as the conventional arrangement where the drive sprocket is adjacent the ground at the rear of the track. The invention is therefore not limited to particular details of this disclosure except to the extent that the following claims are necessarily so limited.

What is claimed is:

1. A track-driven tractor comprising:
   a chassis;
   at least one track;
   at least one sprocket drive having a rotatable hub and a sprocket fixed to the hub for propelling said track;
   an engine and a drive train on the chassis for driving said sprocket drive for rotation of said hub about a substantially horizontal axis of rotation;
   a rotating cutter blade mounted on said sprocket drive at a location which revolves in a path around said axis of rotation, said rotating cutter blade having a cutting edge in a zone bounded by said sprocket and said chassis and being substantially spaced from said sprocket; and
   a stationary cutter blade mounted to said chassis at a location generally tangent to the path of the revolving cutter blade, said stationary cutter blade having a cutting edge that cooperates with said rotating cutter blade to shear refuse that tends to be entrained by said sprocket and wrapped around said hub, said cutting edge of said rotating cutting blade being at an oblique angle to said axis of rotation of said hub.

2. A track-driven tractor comprising:
   a chassis;
   at least one track;
   at least one sprocket drive having a rotatable hub and a sprocket fixed to the hub for propelling said track;
   an engine and a drive train on the chassis for driving said sprocket drive for rotation of said hub about a substantially horizontal axis of rotation;
   a rotating cutter blade mounted on said sprocket drive at a location which revolves in a path around said axis of rotation, said rotating cutter blade having a cutting edge in a zone bounded by said sprocket and said chassis and being substantially spaced from said sprocket;
   a stationary cutter blade mounted to said chassis at a location generally tangent to the path of the revolving cutter blade, said stationary cutter blade having a cutting edge that cooperates with said rotating cutter blade to shear refuse that tends to be entrained by said sprocket and wrapped around said hub; and
   an assembly forming a seal between said hub and said chassis at a plane of separation and relative rotation, wherein at least a portion of said cutting edge of said rotating cutter blade is located radially outward from the plane of separation.

3. A track-driven tractor comprising:
   a chassis;
   at least one track;
   at least one sprocket drive having a rotatable hub and a sprocket fixed to the hub for propelling said track;
   an engine and a drive train on the chassis for driving said sprocket drive for rotation of said hub about a substantially horizontal axis of rotation;
   a rotating cutter blade mounted on said sprocket drive at a location which revolves in a path around said axis of rotation, said rotating cutter blade having a cutting edge in a zone bounded by said sprocket and said chassis and being substantially spaced from said sprocket;
   a stationary cutter blade mounted to said chassis at a location generally tangent to the path of the revolving cutter blade, said stationary cutter blade having a cutting edge that cooperates with said rotating cutter blade to shear refuse that tends to be entrained by said sprocket and wrapped around said hub; and
   said cutting edge of said rotating cutting blade being angled toward an opening formed between said chassis and said track.

4. A method of reducing the build-up of trash around a sprocket drive of a track-driven tractor, said method comprising the steps of:
   (a) providing a movable cutting edge on the sprocket drive;
   (b) providing a fixed cutting edge at the sprocket drive that cooperates with said movable cutting edge;
   (c) arranging said fixed and movable cutting edges so that said movable cutting edge is substantially spaced from the sprocket and so that upon rotation of the sprocket drive, the movable cutting edge moves past the fixed cutting edge in relative close proximity to it to sever material tending to accumulate on the sprocket drive; and
   (d) arranging said fixed and movable cutting edges to angle generally toward an opening formed between the track and the tractor such that the severed material tends to fall out the opening.

5. A method of reducing the build-up of trash around a sprocket drive of a track-driven tractor, said method comprising the steps of:

(a) providing a movable cutting edge on the sprocket drive;

(b) providing a fixed cutting edge at the sprocket drive that cooperates with said movable cutting edge;

(c) arranging said fixed and movable cutting edges so that said movable cutting edge is substantially spaced from the sprocket and so that upon rotation of the sprocket drive, the movable cutting edge moves past the fixed cutting edge in relative close proximity to it to sever material tending to accumulate on the sprocket drive; and (d) both said fixed and movable cutting edges being provided by flat plates and one of said plates being cut for clearance after mounting and being brought into close proximity to the other plate by rotation of the sprocket drive.

* * * * *